June 15, 1937.  W. H. BASELT  2,084,074
CLASP BRAKE
Filed Sept. 28, 1936  2 Sheets-Sheet 1

Inventor:
Walter H. Baselt,
By Orin B. Garner.
Atty.

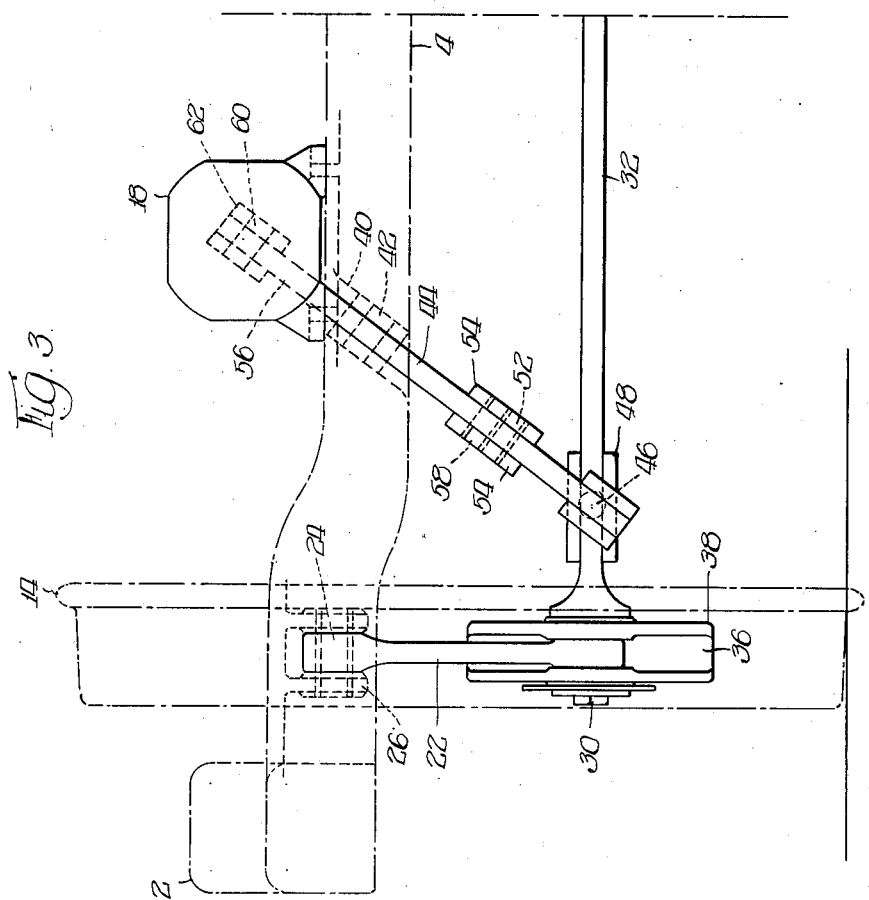

Patented June 15, 1937

2,084,074

UNITED STATES PATENT OFFICE 2,084,074

CLASP BRAKE

Walter H. Baselt, Chicago, Ill., assignor to American Steel Foundries, Chicago, Ill., a corporation of New Jersey Application September 28, 1936, Serial No. 102,881

22 Claims. (Cl. 188—56)

My invention relates to brakes for railway equipment and more particularly brakes of the so-called clasp type wherein brake heads and brake shoes are applied to opposite sides of each wheel.

The primary object of my invention is to provide a very simple and compact arrangement of power means and brake rigging for a railway truck designed specially for use on high speed equipment.

Another object is to provide a clasp brake arrangement for a railway truck designed for use on trains having a low center of gravity wherein power means will be mounted on the truck frame and the brake rigging to be associated therewith will be designed to require a minimum of space.

A still further object of my invention is to provide such a brake rigging wherein the brakes associated with each wheel and axle will be operated by a plurality of power means acting in unison.

With these and various other objects in view, my invention may consist of certain novel features of construction and operation as will be more fully described and particularly pointed out in the specification, claims and drawings appended hereto.

In the drawings which illustrate an embodiment of the device and wherein like reference characters are used to designate like parts—

Figure 3 is an end elevation thereof, the view being taken at the right of the structure shown in Figures 1 and 2.

Figure 1:
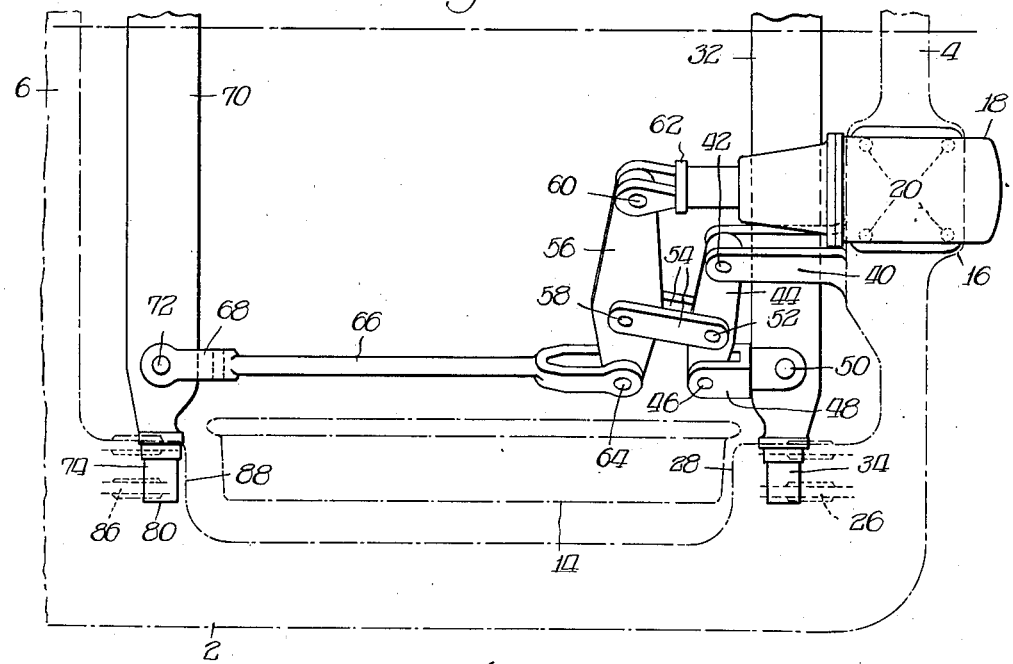
Figure 1 is a top plan view of a truck and brake construction embodying my invention, only one end of the truck being shown and only one side thereof inasmuch as the construction is the same at both sides and at the opposite ends of the truck.

The truck structure shown comprises the usual side frames 2 joined at their opposite ends by the integrally formed end rails 4 and at spaced points intermediate their ends by the integrally formed transoms 6, said side frames 2 having at their opposite ends the spaced column guides 8 and 10 forming therebetween the window opening 12 for connection with a journal box associated with the journal portion (not shown) of the wheel and axle assembly 14. The equalizing arrangement which is associated with the car truck and likewise the bolster which supports the car body are omitted inasmuch as they form no part of my invention.

Adjacent its opposite ends each end rail is provided with a widened portion 16 forming a seat for the power means or the brake cylinder 18 which is secured thereto as by means of the rivets 20.

Figure 2:
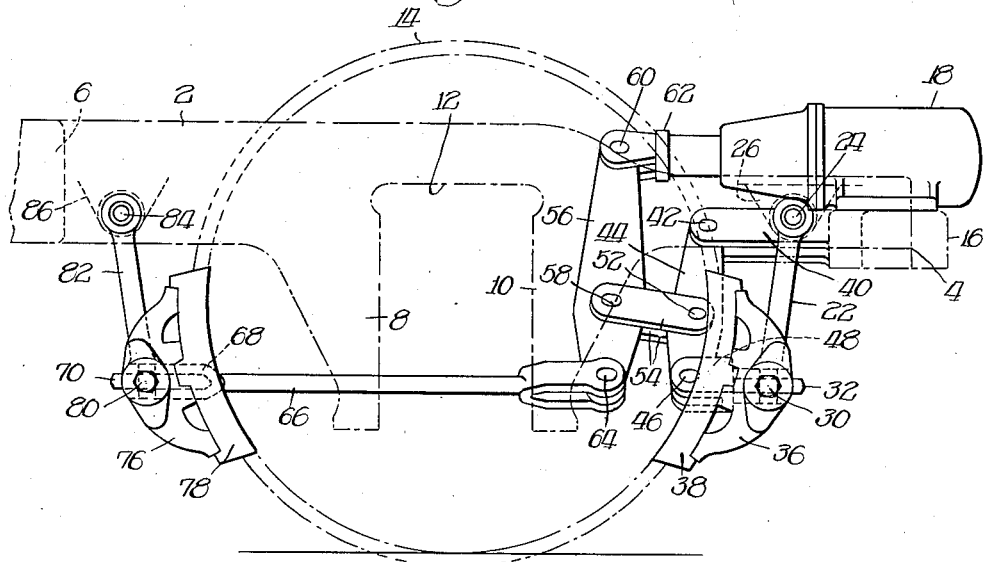
Figure 2 is a side elevation of the truck and brake structure shown in Figure 1.

The brake rigging comprises the hanger 22 (Figure 2, right) which is pivotally supported at its upper end as at 24 from the bracket 26 which is integrally formed with the gusset 28 reinforcing the juncture of the side frame and end rail. Pivotally supported at the lower end of the hanger 22 as at 30 is the brake beam 32; mounted likewise at the pivotal point 30 on the trunnion end 34 of the beam 32 is the brake head 36 with its associated brake shoe 38 arranged for cooperation with the adjacent wheel.

Alongside the seat 16 the end rail has the integrally formed fulcrum bracket 40 and from the said fulcrum bracket is pivotally supported as at 42 the dead lever 44, the lower end of said dead lever being pivotally connected as at 46 to the fulcrum 48 which is secured on the brake beam 32 adjacent its end as by the rivet means 50. Intermediate its ends the dead lever 44 is pivotally connected as at 52 to the live lever 56 by means of the paired straps 54—54. The straps 54 are pivotally connected to the live lever 56 at a point intermediate its ends as at 58. The upper end of the live lever 56 is pivotally connected as at 60 to the piston rod 62 forming a part of the power means 18. The lower end of the live lever 56 is pivotally connected as at 64 to the pull rod 66, said pull rod having at its opposite end the jaw portion 68 between the opposite sides of which may be received the end of the brake beam 70, the rivet 72 forming a securing means for the connection. At the trunnion end 74 of the brake beam 70 is pivotally mounted the brake head 76 and its associated brake shoe 78 arranged for cooperation with the opposite side of the beforementioned wheel, and also at the said pivotal point 80 is connected the lower end of the hanger 82, the upper end of said hanger being pivotally supported as at 84 from the bracket 86 integrally formed with the gusset 88, reinforcing the juncture of the transom 6 with the side frame 2.

In operation, actuation of the power means 18 causes the piston 62 to move to the left (Figures 1 and 2), thus rotating the live lever 56 in a counter-clockwise direction about the pivot 64 at its lower end and through the medium of the straps 54 causing the dead lever 44 to move in a clockwise direction about the pivot 42 at its upper end, thus moving the brake beam 32 to the left and bringing the brake shoe 38 into engagement with the periphery of the adjacent wheel. Continued actuation of the power means causes the live lever 56 to rotate in a counterclockwise direction about the pivot 58 intermediate its ends and moves the pull rod 66 to the right until the brake shoe 78, mounted on the head 76 and supported on the end of the brake beam 70 is brought into engagement with the opposite periphery of the said wheel. Release of the power means causes the parts to move in the reverse direction until they assume their normal inoperative position.

It will be understood that the power means 18 operates in conjunction with a similar power means mounted adjacent the opposite end of the end rail 4 and connected to similar rigging at the opposite side of the truck. It will also be understood that the rigging at the other end of the truck is likewise controlled by a pair of power means operating in conjunction to actuate the rigging at that end of the truck.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a railway car truck the combination of a truck frame comprising an end rail, a wheel and axle assembly, brake cylinders mounted adjacent the opposite ends of said end rail, brackets integrally formed with said end rail adjacent each of said cylinders, hangers supporting brake beams at opposite sides of said assembly, pull rods secured adjacent the opposite ends of one of said beams, fulcrums secured adjacent the opposite ends of the other of said beams, pairs of live and dead levers, said live levers having their upper ends secured respectively to said power means and their lower ends connected respectively to said pull rods, said dead levers having their upper ends pivotally secured respectively to said brackets and their lower ends pivotally connected respectively to said fulcrums, and straps connecting the live and dead levers of each pair.

2. In a four wheel railway car truck the combination of a truck frame having end rails, wheel and axle assemblies, power means mounted on each of said end rails, brake beams supported on opposite sides of each of said assemblies, pull rods connected adjacent the opposite ends of the beams intermediate the wheels, fulcrums secured adjacent the opposite ends of the beams outwardly of the wheels, pairs of live and dead levers supported at each end of said truck, and straps connecting the live and dead levers of each pair intermediate their ends, said live levers at each end of said truck having their upper ends connected respectively to power means and their lower ends connected respectively to said pull rods, said dead levers having their upper ends pivotally hung from an end rail and their lower ends connected respectively to said fulcrums.

3. In a four wheel railway car truck the combination of a truck frame comprising a side frame, an integrally formed end rail, and an integrally formed transverse load carrying member, a wheel and axle assembly, power means mounted on said end rail, a brake hanger pivotally hung from said frame adjacent the juncture of said load carrying member and said side frame, a brake beam supported from said hanger, another brake hanger pivotally hung from said frame adjacent the juncture of said side frame and said end rail, a brake beam supported from said last mentioned hanger, and a pair of live and dead levers connected to each other intermediate their ends, said live lever having its upper end connected to said power means and its lower end connected to said first mentioned beam, said dead lever having its upper end fulcrumed from said end rail and its lower end connected to said last mentioned beam.

4. In a railway car truck the combination of a truck frame having an end rail, a wheel and axle assembly, a side frame, and a transverse load carrying member, power means mounted on said end rail, brackets integrally formed on said end rail adjacent said power means, a brake hanger hung from said frame adjacent the juncture of said load carrying member and said side frame and supporting the brake beam inwardly of said assembly, another brake hanger supporting the brake beam outwardly of said assembly, and a pair of live and dead levers connected to each other intermediate their ends, said live lever having its upper end connected to said power means and its lower end connected by a pull rod to said first mentioned beam, said dead lever having its upper end fulcrumed from said bracket and its lower end pivotally connected to said last mentioned beam.

5. In a four wheel railway car truck the combination of a truck frame having an end rail, a wheel and axle assembly, a plurality of power means mounted on said end rail adjacent the opposite ends thereof, brackets integrally formed on said end rail adjacent its opposite ends, brake beams supported on opposite sides of said assembly, pairs of live and dead levers, and straps connecting the levers of each pair intermediate their ends, said live levers having their upper ends connected respectively to said power means and their lower ends connected respectively by pull rods to the opposite ends of the beam inwardly of said assembly, and said dead levers having their upper ends fulcrumed from said brackets and their lower ends pivotally connected adjacent the opposite ends of the beam outwardly of said assembly.

6. In a four wheel railway car truck the combination of a truck frame having an end rail and a transverse load carrying member, a wheel and axle assembly, hangers supporting a brake beam adjacent said load carrying member, other hangers supporting a brake beam adjacent said end rail, pull rods connected adjacent the ends of said first mentioned beam, fulcrums secured adjacent the ends of said last mentioned beam, power means mounted on said end rail adjacent the opposite ends thereof, pairs of live and dead levers, said live levers having their upper ends connected respectively to said power means and their lower ends connected respectively to said pull rods, said dead levers having their upper ends fulcrumed from said end rail and their lower ends connected respectively to said fulcrums, and straps connecting the live and dead levers of each pair.

7. In a four wheel railway car truck the combination of a truck frame comprising an end rail, a wheel and axle assembly, brake beams supported on opposite sides of said assembly, brackets integrally formed with said end rail on opposite sides of the longitudinal center line of said truck, brake cylinders mounted on said end rail adjacent each of said brackets, brake beams supported on opposite sides of said assembly, and pairs of live and dead levers, the levers of each pair being connected together intermediate their ends, said live levers having their upper ends connected respectively to said brake cylinders and their lower ends connected respectively to the opposite ends of the beam inwardly of said assembly, and said dead levers having their upper ends connected respectively to said brackets and their lower ends connected adjacent the respective ends of the beam outwardly of said assembly.

8. In a four wheel railway car truck the combination of a truck frame having an end rail, a wheel and axle assembly, brake beams supported at opposite sides of said assembly, power means mounted on said end rail, a bracket integrally formed on said end rail adjacent said power means, and live and dead levers connected intermediate their ends to each other and having their upper ends connected respectively to said power means and to said bracket and their lower ends connected respectively to the beam inwardly of said assembly and to the beam outwardly of said assembly.

9. In a four wheel railway car truck the combination of a truck frame having an end rail, a plurality of power means mounted on said end rail, a wheel and axle assembly, hangers supporting brake beams at opposite sides of said assembly, pull rods connected adjacent the ends of one of said beams and fulcrums secured adjacent the ends of the other of said beams, pairs of live and dead levers, said live levers having their upper ends pivotally connected to said power means and their lower ends connected respectively to said pull rods, said dead levers having their upper ends fulcrumed from said end rail and their lower ends secured to said fulcrums, and operative connections between the live and dead levers of each pair.

10. In a four wheel railway car truck the combination of a truck frame having an end rail, a wheel and axle assembly, a plurality of power means mounted on said end rail, fulcrums integrally formed on said end rail adjacent said power means, brake beams supported on opposite sides of said assembly, and pairs of live and dead levers, the levers of each pair being connected intermediate their ends to each other, said live levers having their upper ends connected to said power means respectively and their lower ends connected respectively to the opposite ends of one of said beams, said dead levers having their upper ends connected respectively to said fulcrum means and their lower ends connected respectively to the opposite ends of the other of said beams.

11. In a four wheel railway car truck the combination of a truck frame having end rails, wheel and axle assemblies, a plurality of power means mounted on each of said end rails, hangers supporting brake beams on opposite sides of each wheel and axle assembly, pairs of cylinder levers having their upper ends connected to said power means and their lower ends connected to pull rods fulcrumed from said beams intermediate the wheels, pairs of fulcrum levers having their upper ends fulcrumed from said end rails and their lower ends operatively connected to the beams outwardly of said wheels, and operative connections between said cylinder levers and said fulcrum levers at each end of said truck.

12. In a railway car truck the combination of a truck frame having an end rail, wheel and axle assemblies, a plurality of power means mounted on said end rail, brake rigging comprising brake beams supported on opposite sides of a wheel and axle assembly, cylinder levers having their upper ends connected respectively to said power means, pull rods connecting the lower ends of said cylinder levers to the brake beam inwardly of said assembly, fulcrum levers having their upper ends pivotally hung from said end rail and having their lower ends fulcrumed from said beam outwardly of said assembly, and an operative connection between each cylinder lever and the associated fulcrum lever.

13. In a four wheel railway car truck the combination of a truck frame having an end rail, a wheel and axle assembly, a bracket integrally formed on an end rail adjacent an end thereof, a brake cylinder mounted on said end rail adjacent said bracket, brake beams supported at opposite sides of said assembly, and live and dead levers connected to each other intermediate their ends, said live lever having its upper end connected to said power means and its lower end connected to the beam inwardly of said assembly, said dead lever having its upper end connected to said bracket and its lower end connected to the beam outwardly of said assembly.

14. In a four wheel railway car truck the combination of a truck frame having end rails, wheel and axle assemblies, brake beams supported at opposite sides of each of said assemblies, a plurality of power means mounted on an end rail, pairs of live and dead levers, said live levers having their upper ends connected to said power means and said dead levers having their upper ends fulcrumed from said end rail, said live levers having their lower ends connected by pull rods to a beam inwardly of one of said assemblies and said dead levers having their lower ends connected to the beam outwardly of said assembly, and operative connections between the live and dead levers of each pair.

15. In a four wheel railway car truck the combination of a truck frame having an end rail, a wheel and axle assembly, hangers supporting brake beams at opposite sides of said assembly, a pull rod connected adjacent the end of one of said beams and a fulcrum secured adjacent the end of the other of said beams, power means mounted on said end rail, a cylinder lever having its upper end connected to said power means and its lower end connected to said pull rod, and a dead lever pivotally supported at its upper end from said end rail and connected at its lower end to said fulcrum, and straps connecting said cylinder lever and said dead lever.

16. In a four wheel railway car truck the combination of a truck frame having an end rail, a wheel and axle assembly, hangers supporting brake beams at opposite sides of said assembly, a pull rod connected adjacent the end of one of said beams, a fulcrum secured adjacent the end of the other of said beams, power means mounted on said end rail, a live lever connected at its upper end to said power means and at its lower end to said pull rod, and connected intermediate its ends to a dead lever, said dead lever having its lower end connected to said fulcrum and its upper end secured to said end rail.

17. In a four wheel railway car truck the combination of a truck frame having an end rail, wheel and axle assemblies, power means and fulcrum means secured to said end rail, brake rigging comprising brake beams supported at opposite sides of a wheel and axle assembly, a cylinder lever having its upper end connected to said power means and its lower end connected to one of said beams, a fulcrum lever having its upper end connected to said fulcrum means and its lower end connected to the other of said beams, and an operative connection between said levers.

18. In a four wheel railway car truck the combination of a truck frame having an end rail, a wheel and axle assembly, power means mounted on said end rail, fulcrum means integrally formed on said end rail adjacent said power means, and a pair of live and dead levers connected intermediate their ends to each other, said live lever having its upper end connected to said power means and its lower end connected to one of said beams, and said dead lever having its upper end connected to said fulcrum means and its lower end connected to the other of said beams.

19. In a four wheel railway car truck the combination of a truck frame having an end rail, wheel and axle assemblies, power means and fulcrum means secured to said end rail, brake rigging comprising brake beams supported at opposite sides of a wheel and axle assembly, a cylinder lever having its upper end connected to said power means and its lower end connected to one of said beams, a fulcrum lever having its upper end connected to said fulcrum means and its lower end connected to the other of said beams, and links connecting said levers at points intermediate their ends.

20. In a railway car truck the combination of a truck frame comprising an end rail, a wheel and axle assembly, power means mounted on said end rail, brake rigging comprising brake beams supported on opposite sides of said assembly, a cylinder lever pivotally connected at its upper end to said power means, a pull rod connecting the lower end of said cylinder lever to the beam inwardly of said assembly, a dead lever fulcrumed from said end rail and connected at its lower end to the beam outwardly of said assembly, and an operative connection between said levers.

21. In a four wheel railway car truck the combination of a truck frame having a transverse member, a wheel and axle assembly, brake beams supported at opposite sides of said assembly, power means mounted on said transverse member, a bracket integrally formed on said transverse member adjacent said power means, and live and dead levers connected intermediate their ends to each other and having their upper ends connected respectively to said power means and to said bracket and their lower ends connected respectively to the beam inwardly of said assembly and to the beam outwardly of said assembly.

22. In a four wheel railway car truck the combination of a truck frame having a transverse member, wheel and axle assemblies, power means and fulcrum means secured to said transverse member, brake rigging comprising brake beams supported at opposite sides of a wheel and axle assembly, a cylinder lever having its upper end connected to said power means and its lower end connected to one of said beams, a fulcrum lever having its upper end connected to said fulcrum means and its lower end connected to the other of said beams, and means connecting said levers at points intermediate their ends.

WALTER H. BASELT.